US006714352B2

(12) United States Patent
Rogers et al.

(10) Patent No.: US 6,714,352 B2
(45) Date of Patent: Mar. 30, 2004

(54) MINI-OPTICAL LIGHT SHELF DAYLIGHTING SYSTEM

(75) Inventors: Zach L. Rogers, Layfayette, CO (US); Michael J. Holtz, Boulder, CO (US); Caroline M. Clevenger, Boulder, CO (US); Neall E Digert, Westminster, CO (US)

(73) Assignee: Architectural Energy Corporation, Boulder, CO (US)

(*) Notice: Subject to any disclaimer, the term of this patent is extended or adjusted under 35 U.S.C. 154(b) by 0 days.

(21) Appl. No.: 10/293,689

(22) Filed: Nov. 11, 2002

(65) Prior Publication Data

US 2003/0112518 A1 Jun. 19, 2003

Related U.S. Application Data

(63) Continuation-in-part of application No. 09/776,319, filed on Feb. 2, 2001, now Pat. No. 6,480,336, which is a continuation-in-part of application No. 09/249,664, filed on Feb. 12, 1999, now Pat. No. 6,239,910.

(51) Int. Cl.[7] ........................ G02B 17/00; G02B 27/00; A47H 1/00; E06B 9/08

(52) U.S. Cl. ........................ 359/596; 359/597; 160/104

(58) Field of Search ................................ 359/591, 593, 359/594, 596, 597; 160/104

(56) References Cited

U.S. PATENT DOCUMENTS

| | | | | |
|---|---|---|---|---|
| 2,146,816 A | * | 2/1939 | Grassby, Jr. | 359/596 |
| 2,546,335 A | * | 3/1951 | Friend | 359/596 |
| 6,239,910 B1 | * | 5/2001 | Digert | 359/596 |

* cited by examiner

*Primary Examiner*—Christopher Mahoney
(74) *Attorney, Agent, or Firm*—Patton Boggs LLP

(57) ABSTRACT

Each light slat of the Mini-Optical Light Shelf daylighting system consists of a light reflecting segment that comprises the top surface of the light slat. A light shading segment and a light redirecting segment comprise the bottom surface of the light slat. The daylight incident on the daylight collection section of the glazing is collected by the optically shaped light reflecting segment of the light slats and redirected onto the ceiling plane of the room in a glare free, uniform manner. In addition, the light redirecting segment of each light slat functions to redirect incident daylight, that is reflected off the light reflecting segment of the adjacent light slat at angles above a predetermined threshold, onto the ceiling plane of the room. The light shading segment functions to block low altitude components of incident daylight from entering the room.

17 Claims, 4 Drawing Sheets

MINI-OPTICAL LIGHT SHELF DAYLIGHTING SYSTEM

CROSS REFERENCE TO RELATED APPLICATIONS

This application is a continuation-in-part of U.S. patent application Ser. No. 09/776,319, titled "Mini-Optical Light Shelf Daylighting System," filed on Feb. 2, 2001, now U.S. Pat. No. 6,480,336 which is a continuation-in-part of U.S. patent application Ser. No. 09/249,664, titled "Mini-Optical Light Shelf Daylighting System" and filed on Feb. 12, 1999, now U.S. Pat. No. 6,239,910 B1.

FIELD OF THE INVENTION

This invention relates to interior space daylighting systems and, in particular, to a mini-optical light shelf daylighting system that redirects incident daylight on to the ceiling plane of an interior space to illuminate the interior space.

Problem

It is a problem in the field of interior space illumination to provide a cost effective mode of illumination that makes use of the incident daylight without the need for complex systems or significant occupant intervention. Existing daylighting systems are of limited effectiveness, limited applicability due to their architectural limitations, or require complex and expensive mechanical and electronic control mechanisms. In addition, glare represents a significant problem with existing daylighting systems, since glare, caused by direct sunlight penetrating through or over the daylighting system, or sunlight striking the daylighting system components and being reflected into the interior space, causes visual discomfort.

There is a need for systems that provide improved energy efficiency and environmental quality in buildings. One such example is a system that reduces the consumption of electricity for lighting. One option for reducing electricity consumption for lighting is to use daylight to illuminate occupied building spaces during daylight hours. These systems are termed "daylighting systems." The key to the widespread use of daylighting systems is the provision of such a system that is both inexpensive and easily applied to both new and existing buildings. In addition to the savings attributed to reduced electricity consumption, daylighting systems typically also result in increased productivity by the occupants of the illuminated space, reduced health problems evidenced by the occupants of the illuminated space, and pollution reduction. This is because there appears to be a strong correlation between the quality of the luminous environment and exposure to daylight and the overall health and productivity of the occupants.

One such existing daylighting system is the traditional interior light shelf, which comprises an optical device which receives daylight that is transmitted through a window and redirects it onto the interior ceiling plane, thereby creating a useful source of interior illumination. The basic light shelf concept typically comprises a wide flat elongated interior light shelf located adjacent to a window and protruding into a room from the exterior wall of a building, and/or an exterior light shelf of weather-resistant construction projecting from the exterior wall of the building, coplanar with the interior light shelf to receive incident daylight. The incident daylight is reflected by the interior and/or exterior surfaces onto the ceiling of the occupied space by a diffuse or specular horizontal or slightly sloped surface of the light shelf, which light reflecting surface is located above a view glazing. However, the interior light shelf typically protrudes a significant distance into the occupied space and is problematic from architectural, visual comfort, mechanical and aesthetic standpoints in many room applications.

Another existing system is disclosed in PCT published application WO 91/03682 which discloses an illuminating apparatus comprising a plurality of solid illuminating channels, manufactured from a transparent material, that are adhesively bonded together to form cavities in the illuminating apparatus. The cavities create a single smooth light reflecting surface on the bottom surface of each illuminating channel and two interconnected light reflecting surfaces on the top surface of each illuminating channel. Incident light is either reflected directly off the single smooth light reflecting surface on the bottom surface of an illuminating channel or total internal reflection off the opposite surfaces of the illuminating channel. The total internal reflection consists of incident light reflecting in turn off a first of the two interconnected light reflecting surfaces on the top surface of an illuminating channel, the single smooth light reflecting surface on the bottom surface of the illuminating channel, then the second of the two interconnected light reflecting surfaces on the top surface of the illuminating channel. This illuminating apparatus is costly and heavy due to the use of plurality of solid illuminating channels, manufactured from a transparent material, that are adhesively bonded together. The need for the use of solid material to form the illuminating channels is due to the need to implement total internal reflection to redirect a portion of the incident light.

The above-noted U.S. patent application Ser. No. 09/249,664, titled "Mini-Optical Light Shelf Daylighting System," filed on Feb. 2, 2001 and U.S. Pat. No. 6,239,910 B1, titled "Mini-Optical Light Shelf Daylighting System" represent significant advances in the field of daylighting systems. These systems are implemented in the paradigm of a window treatment positioned adjacent to the interior surface of the window glazing and located above the normal occupant viewing height. These daylighting systems redirect the incident daylight that arrives through the window glazing of the building from a range of directions and altitude angles into a limited spread of light onto the ceiling of the interior space of the room. The light redirecting elements used in these systems have a unique geometry which consists of 3 adjoining arcs with descending radii forming a slat having a specular top optical surface. This unique geometry of the light slats optimally redirects light upwards without light striking the bottom surface of the adjacent light shelf thereby preventing glare in the ordinary field of view. A light blocking feature, comprising a segment that is integral to light reflecting surface and extending therefrom at a predetermined location toward the window glazing, forms an acute angle with the light reflecting surface and serves to create a cut-off angle of 15°. While these systems represent a significant advance over the known daylighting systems, the amount of the incident daylight blocked by these systems reduces their daylighting efficiency.

Solution

The above-described problems are solved and a technical advance achieved the field by the present Mini-Optical Light Shelf daylighting system (termed "MOLS daylighting system" herein). The MOLS daylighting system is a passive, static optical device that is typically mounted in a window opening of a building. The MOLS daylighting system receives daylight transmitted through the window opening and efficiently redirects it uniformly onto the interior ceiling plane of a room (or other interior space) in a diffuse manner, thereby creating a useful source of interior illumination.

The MOLS daylighting system comprises multiple light slats, each of which allows light to be efficiently collected and accurately directed onto the ceiling plane of a room, while at the same time shading the occupants of the room from direct daylight penetration through the light slats at angles above 5°. The light slats are narrow and can be implemented in the paradigm of an insert located between adjacent panes of the glazing or in a mini-blind window treatment. The window area is typically partitioned into a view related glazing section and a daylight collection and redirection glazing section. The occupant's views out of the building remain unobstructed through the view related section of the glazing to a height of approximately seven feet above the floor. Traditional window treatments can be used for this portion of the glazing for shading, privacy, and blackout control.

Each light slat consists of a light reflecting segment that comprises the top surface of the light slat. A light shading segment and a light redirecting segment comprise the bottom surface of the light slat. The daylight incident on the daylight collection section of the glazing is collected by the optically shaped light reflecting segment of the light slats and redirected onto the ceiling plane of the room in a glare free, uniform manner. In addition, the light redirecting segment of each light slat functions to redirect incident daylight, that is reflected off the light reflecting segment of the adjacent light slat at angles above a predetermined threshold, onto the ceiling plane of the room in a glare free, uniform manner. The light shading segment functions to block low altitude components of incident daylight from entering the room between adjacent slats.

The MOLS daylighting system produces effective daylighting for typical ambient light levels for the perimeter zones of a building, and can effectively operate for room depths in excess of 35 feet deep, depending on the vertical height of the window and the particular implementation of the MOLS daylighting system. The optical geometries of the light slats and the associated reflective surface characteristics cooperatively diffuse the collected daylight uniformly across the ceiling plane of the room. The resultant indirect lighting is striation free and substantially uniform in illuminance. The use of daylight preserves the visual and psychological connection between the occupants and the outdoors due to the subtle color and illuminance changes which occur throughout the day. Visual comfort is enhanced by evenly diffusing the daylight across the ceiling plane of the room from the perimeter wall to the interior extent of the illumination and by minimizing any downward directed rays.

DETAILED DESCRIPTION

Glossary

The following definitions are provided to clarify the terminology used herein:

Room—The interior space of a building that can optionally be delimited by interior walls, floor, ceiling and, for the purpose of the examples used in the present description, is located juxtaposed to a window opening.

Building—A structure that serves to enclose a predefined set of interior space (such as rooms) for use by occupants, which use includes residential, commercial, manufacturing, office, and the like without limitation.

Daylighting—The use of natural light from the sky under natural conditions (including daylight from both the solar disk and the sky dome) or overcast sky as an interior illuminant.

Daylighted Space—The space bounded by vertical planes rising from the boundaries of the daylighted area on the floor to the floor or ceiling above.

Daylight—As used herein, this term describes the natural light that is incident on a window glazing.

Theory of Operation of the Present Mini-Optical Light Shelf Daylighting System

Figure 3:
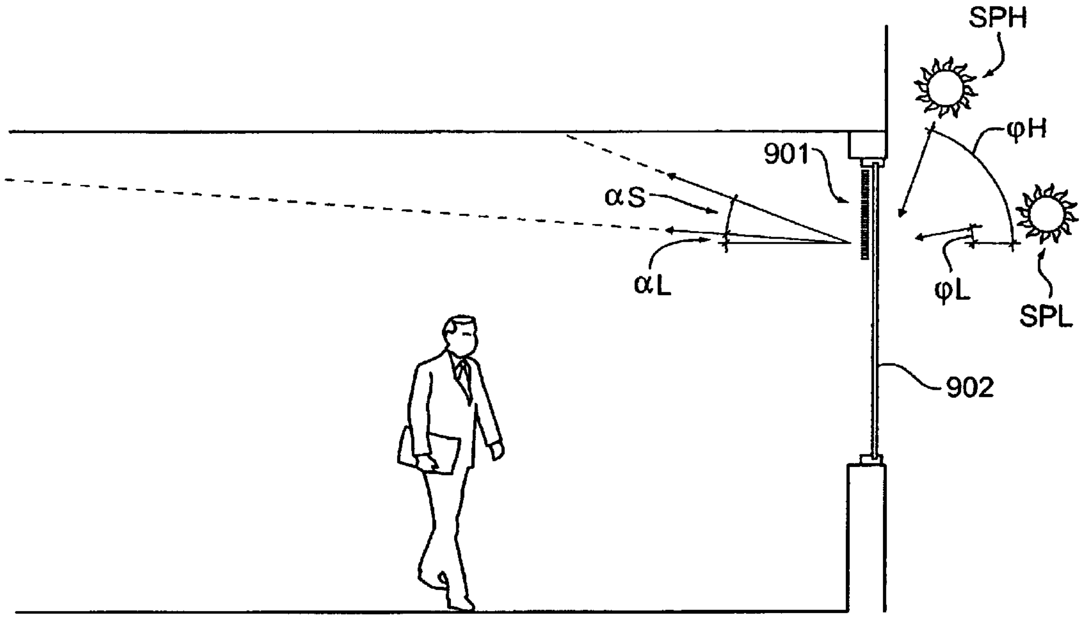
FIGS. 3 and 4 illustrate a side cross-section view of a typical interior space in which the MOLS daylighting system is installed.
Figure 4:
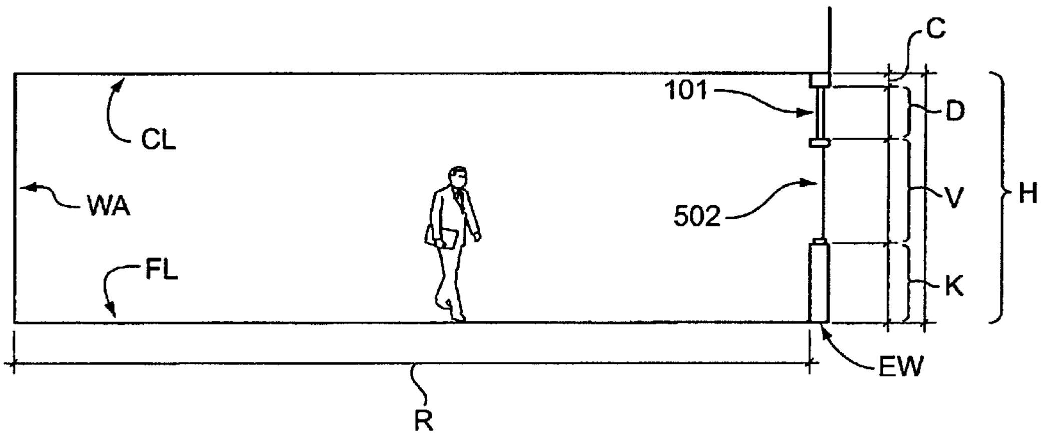

The typical interior space of a building in which the present MOLS daylighting system 100 is used is illustrated in side cross-section view in FIGS. 3 & 4. This particular interior space is selected to illustrate the capabilities of the MOLS daylighting system 100 and is not intended to limit the applicability of the concepts disclosed herein. Many non-residential spaces are configured in a manner that is identical to or similar to the arrangement shown in FIGS. 3 & 4 and this example serves to clearly illustrate the capabilities of the present MOLS daylighting system 100. The space, termed "interior space" herein is shown as having an interior height H which is typically 9 feet 6 inches (approximately 3 meters) and a depth R that is greater than 12–15 feet (approximately 4–5 meters) extending from the window glazing 402, which is located on the exterior wall EW, to an interior wall WA or other internal partition. However, many modern office space designs implement an interior space that extends from the exterior wall EW to the midline of the building, or the opposite exterior wall, where the depth R can be in excess of 30 feet.

The window configuration shown in FIG. 4 comprises a knee wall K of typical height of 3 feet (approximately 1 meter) in height, on top of which is installed a set of window glazing 402 which extend vertically typically another 6 feet (approximately 2 meters) and which are terminated at the top thereof by a small framing wall C, typically of height 6 inches (approximately ⅙ meter). The window glazing 402 is divided into two segments: view glazing V and daylighting glazing D. The window glazing 402 may be a single glazing element as shown in FIG. 4 or can be two separate elements: view related glazing 302 and daylighting glazing 301 as shown in FIG. 3. Within this interior space, the surfaces have typical light reflectance or light transmittance characteristics. Some typical values or ranges of values for light reflectance are: ceiling CL=0.8, wall WA=0.5, floor FL=0.2, vision glass=0.1 to 0.3 for a typical interior space. The light transmittance values for the window glass are up to 0.6 to 0.8 for typical daylight window glass and in the range of 0.2 to 0.8 for typical view window glass.

The MOLS daylighting system 100 is positioned either adjacent to the window glazing 402/301 or within the window glazing 301, and located above the normal occupant viewing height. Thus, the typical installation of the MOLS daylighting system 100 typically extends from seven feet (approximately 2⅓ meters) above the floor upward to the top of the window glazing 402 or the daylight glazing 301. The occupants' views out of the building are unobstructed by the MOLS daylighting system 100, since this system is located above the normal occupant viewing height. The MOLS daylighting system 100 receives the unobstructed incident daylight that passes through the daylighting section D of the window glazing 402, collects this incident daylight and redirects it onto the ceiling surface CL in a glare free manner. The MOLS daylighting system 100 can have attached to the bottom thereof a light shading element, such as a mini-blind, to control the light transmission into the room through the view glazing 302. Since this feature is illustrated in the above noted prior patents, it is not described in detail herein.

Figure 6:
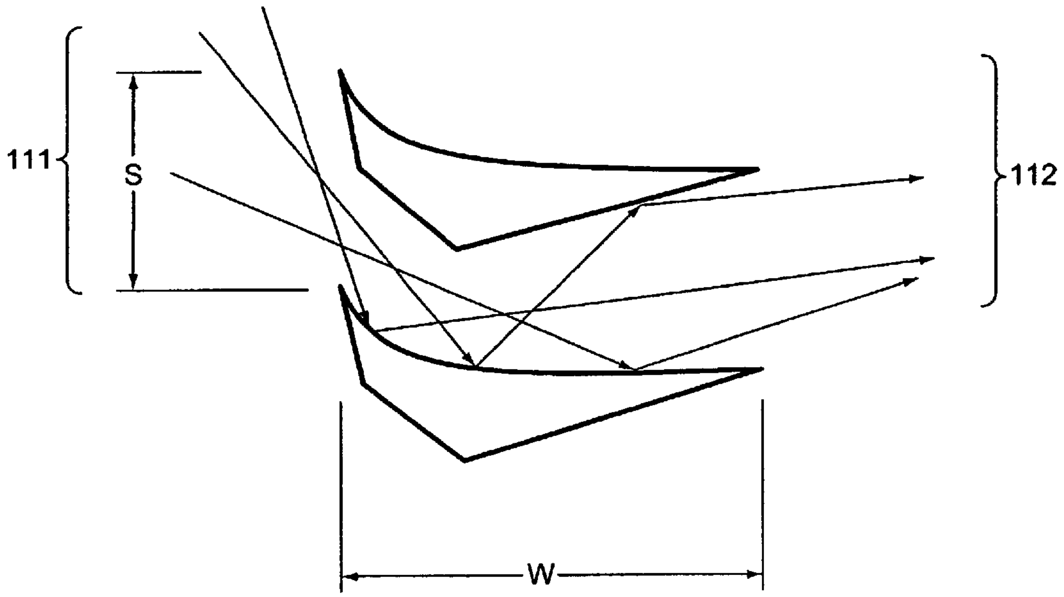
FIG. 6 illustrates a side cross-section view of a pair of typical adjacent individual light slat of the MOLS daylighting system and ray tracings to illustrate the operation of the light slat.

The primary optical objective of the MOLS daylighting system 100, as shown by the ray tracing diagram in FIG. 6, is to redirect the incident daylight that arrives through the window glazing 402/301 of the building from the entire range of directions and altitude angles into a limited spread of light onto the ceiling of the interior space of the room. The sun typically changes position in the sky from a high location SPH at an angle of H to a low sky position SPL at an angle of L during the course of the day and year. The MOLS daylighting system 100 is a passive optical system that accomplishes this objective. Direct solar radiation arrives at the window glazing 301 from constantly changing altitude and azimuth as a function of both time of day and season of the year. Diffuse sky radiation arrives from all visible areas of the sky dome. A significant amount of this incident light is redirected by the MOLS daylighting system 100 into a narrow beam of light onto the ceiling of the room, that ranges from a low angle of αL to a high angle of αS. This narrow spread of light αS−αL changes minimally over the course of the sun's path across the sky from SPH to SPL. The ambient light level in the interior space should be on the order of 15 to 30 foot candles, and while this intensity may not satisfy the task lighting needs at the desk plane of an open interior space, with the desk plane being 30 inches (approximately 1 meter) above the floor level, it does provide sufficient ambient lighting in the interior space to obviate the need for much of the interior space electric lighting.

MOLS Daylighting System Architecture

Figure 1:
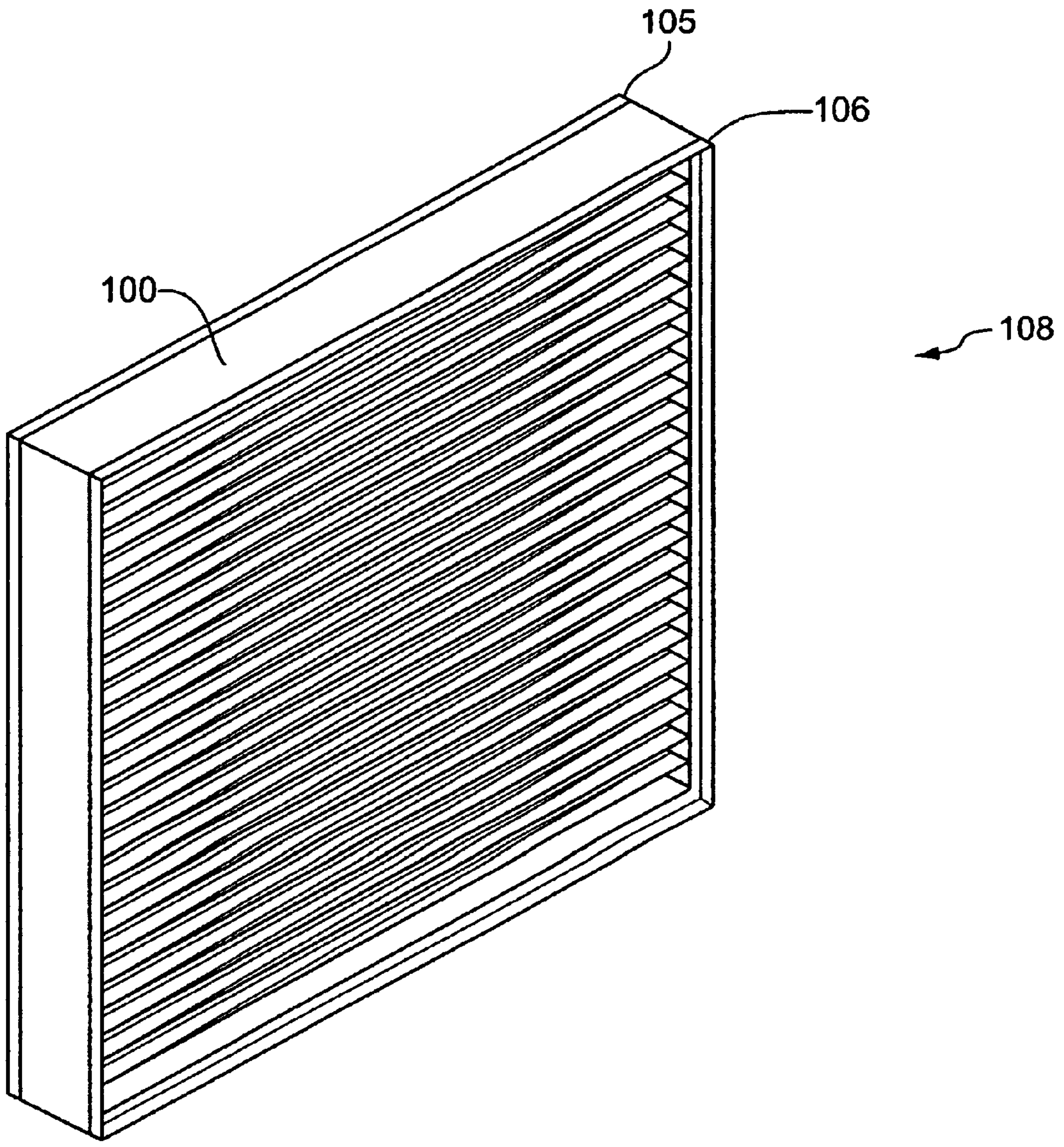
FIGS. 1 and 2 illustrate a front perspective view in elevation and a front perspective exploded view of the MOLS daylighting system implemented as part of the window glazing.
Figure 2:
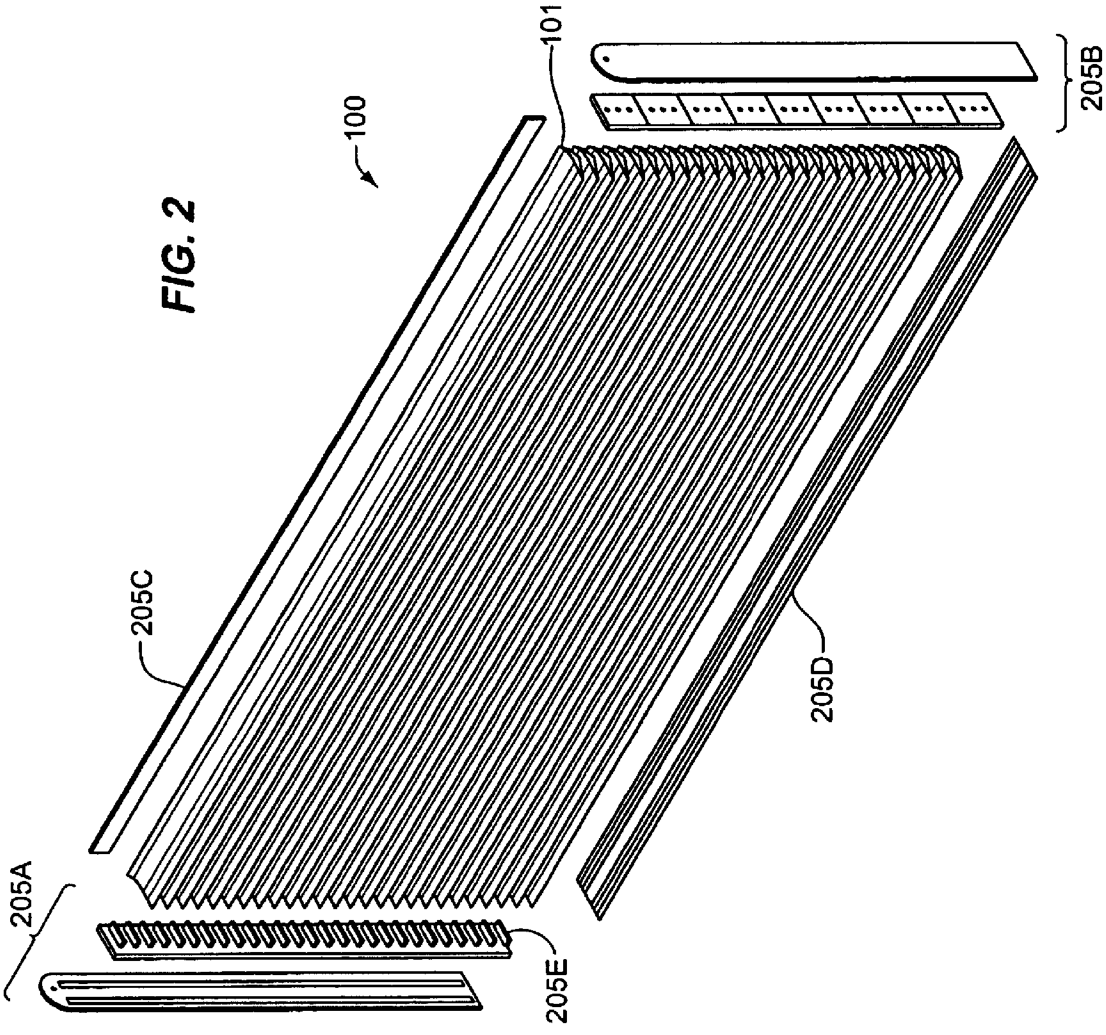

FIGS. 1 and 2 illustrate a front perspective view in elevation and a front perspective exploded view of the MOLS daylighting system 100 implemented as part of the window glazing. The light slats 101 used in the MOLS daylighting system 100 are designed to match the solar profile angle which is created by viewing the incoming daylight in a section that is cut perpendicular to the window pane and through the depth W of the MOLS daylighting system 100. For the same solar position, the profile angle varies as a function of the window orientation. It is desirable to use as much diffuse daylight as possible for the interior lighting of the room and it is therefore desirable to implement the light slats 101 to be operational over a wide range of profile angles to work with all solar positions using a single light slat shape. As shown in FIG. 3, the typical range of solar elevation during the course of the year results in usable daylight having a profile angle in the range from H to L (approximately 10° to 80°), since daylight below 10° is typically blocked by surrounding structures or vegetation and daylight above 80° has high reflectance losses due to the window glazing.

Figure 5:
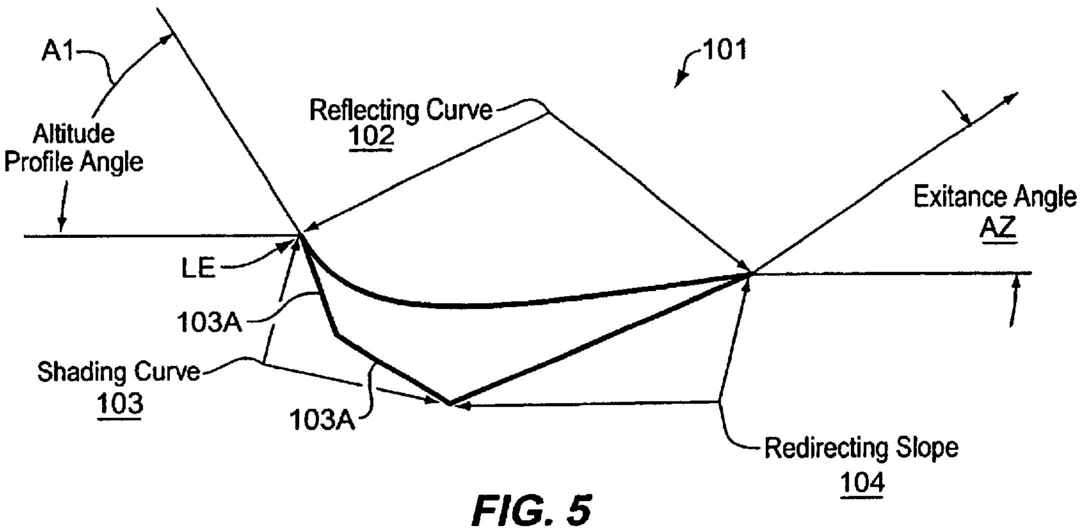
FIG. 5 illustrates a side cross-section view of a typical individual light slat of the MOLS daylighting system.

FIG. 5 illustrates a side cross-section view of the MOLS daylighting system 100 and FIG. 6 illustrates a side cross-section view of a pair of typical adjacent individual light slat of the MOLS daylighting system and ray tracings to illustrate the operation of the light slat. The MOLS daylighting system 100 employs multiple light slats 101, each containing the same optically shaped light slat surface 102 that is optionally coated with a film or specular material formed on a substrate and optimally optically shaped to allow the incident light 111 to be collected and accurately redirected 112 onto the ceiling surface CL including redirecting the incident daylight that is reflected off the bottom surface 101B of the adjacent optical light slat. Therefore, the light slats are self-shading to prevent glare. The light slats 101 of the MOLS daylighting system 100 are of depth W and construction to enable the MOLS daylighting system 100 to be inexpensively manufactured and installed adjacent to the window 402/301 or between the panes of the window glazing 301.

The MOLS daylighting system 100 can be constructed to reside between two adjacent panes 105, 106 of a multiple pane window glazing, such as daylighting glazing 301, or in an alternative embodiment, can be considered an integral component of the window glazing subsystem, in which case, the MOLS system 108 comprises the panes of the window glazing in combination with the MOLS daylighting elements 100. In this application, support for the multiple light slats 101 can be implemented as a pair of end supports 112, 113 that are attached to or abutting to the window glazing frame. The MOLS daylighting system 100 is constructed on a frame that includes vertical supports 205A, 205B, header 204C, and base support 204D wherein the vertical supports 205A, 205B comprise a support for the multiple light slats 101. The vertical supports 205A, 205B are attached to a rigid header element 204C and base support 204D that serve as support members. The header element 204C and base support 204D are oriented to be in a parallel, spaced apart relationship with the top-most light slat, wherein the header element 204C and base support 204D are spaced from the top-most light slat 101 by a distance B, which is typically on the order of 2 inches. The vertical supports 205A, 205B include a plurality of mounting members 204E formed at predetermined locations in the vertical support members 204A, 204B for interconnecting with the light slats 101 to support the light reflecting slats 101 in a substantially parallel, equally spaced apart relationship.

Light Reflective Element Optical Features

An additional objective of the MOLS daylighting system 100 is to shade most of the low altitude daylight to thereby prevent the incident daylight 111 from creating direct glare as well as reflected glare on work surfaces and the occupants' field of view that are located in the interior space. The shading of all direct daylight is not necessary since a transitory period of direct daylight in the early morning and late afternoon, if kept to a minimum, is not objectionable. The MOLS daylighting system 100 shades solar altitude angles that are above a predetermined angle 15° to thereby minimize this problem. The use of light shading feature 103 located proximate the window opening provides the necessary control of the incident daylight 111 to shade the low altitude daylight, as is described below.

The light slats 101 of the MOLS daylighting system 100 have a unique geometry which consists of a complex arc 102 with descending radii forming a slat (with a typical W=2.75 inches) having a specular top optical surface. This unique geometry of the light slats 101 optimally redirects light upwards at an angle above the horizontal and includes the light striking the bottom surface of the adjacent light slat being reflected upwards by the top surface of the light slat at an angle above the horizontal to thereby prevent glare.

The MOLS daylighting system 100 provides direct solar shading of interior task surfaces, using the spacing between adjacent light slats 101 and also by use of light shading feature 103, while efficiently collecting, redirecting and diffusing daylight across the interior ceiling surface CL. The light shading feature 103 is a segment that extends from the window glazing toward the distal end of the light slat 101, forming an acute angle with the light reflecting surface 102. In this regard, the light reflecting surface 102 and the light shading feature 103 together form an inverted V-shaped element. In addition, a light redirecting segment 104, integral to the bottom surface of the light slat 101 and extending from an end of the light shading feature 103 toward the edge of the light slat 101 distant from the window glazing, redirects incident daylight that is reflected from an adjacent light reflecting surface 102 onto the ceiling surface of the room. The light slats 101 of the MOLS daylighting system 100 are substantially linear and geometrically identical, mounted parallel in orientation and identically spaced vertically at intervals S, where a typical value of S=1 inch for the case where W=2.75 inches and the ratio of S/W must always be 1/2.75.

In a typical application, once the target latitudes are defined, the next step is to optimize the amount of light that would initially enter the MOLS daylighting system 100. This correlates to optimizing the shading curve, as determined graphically, of the MOLS slat to maximize the amount of high summer sun entering the system since the greatest savings due to daylighting occur during the summer months when cooling loads are at their highest. Another goal is to balance the amount of light entering the system throughout the year for the variety of incident sun angles, hence, creating a balanced MOLS daylighting system 100 luminous output for all incident sun angles. The lower winter sun angles are viewed as less important, since the cooling load benefits due to turning off electric lighting are typically very low to non-existent during the winter months. Thus, the chart of vertical illuminance vs. solar altitude profile angle can be used to identify the output of the MOLS daylighting system 100 for various shading curves.

The direct solar resource on a south facing vertical surface at 400 latitude is used as a baseline. In order to balance the luminous output of the MOLS daylighting system 100, a target vertical illuminance was defined at 3500 fc. That is, whenever possible, the effective illuminance entering the MOLS system would be around 3500 fc. The effective vertical illuminance is the vertical illuminance that enters the MOLS system directly spread over the entire area of MOLS daylighting system 100, that is the illuminance that does not get absorbed by the shading surface 103. During higher Altitude Profile Angles, the vertical solar resource is less than 3500 fc and so for these angles the effective vertical illuminance is maximized. As mentioned earlier, the lower winter Altitude Profile Angles are viewed as less important. The MOLS daylighting system 100 successfully maximizes the amount of high angle sun that enters the MOLS daylighting system 100. Also, throughout the fall and spring months, the MOLS daylighting system 100 effectively balances the solar resource, maintaining an effective vertical illuminance of roughly 3500 fc. Due to other constraints of the optimization process, the effective winter sun entering the MOLS daylighting system 100 was allowed to drop below this target level of 3500 fc.

The MOLS daylighting system 100 functions independent of the building's window glazing system and therefore can be used with any commercially available glazing product in both new construction and in a retrofit application. The MOLS daylighting system 100 is totally static and requires no adjustment of tilt throughout the day or during the year to account for variations in the position of the sun in the sky.

Optical Characteristics of MOLS Daylighting System

The geometric characteristics of the MOLS daylighting system can be understood by referencing FIG. 5 which illustrates a side cross-section view of a typical individual light slat 101 of the MOLS daylighting system and FIG. 6 illustrates a side cross-section view of a pair of typical adjacent individual light slat of the MOLS daylighting system and ray tracings to illustrate the operation of the light slat.

The light reflecting surface 102 of the light slats 101 uses a different portion of the optical surface for different profile angles. High profile angles use the forward end of the light reflecting surface 102 while low profile angles use the back portion of the light reflecting surface 102. Thus, for a particular profile angle, only a limited portion of the light reflecting surface 102 is used to reflect the incident daylight. As the profile angles vary, the incident daylight strikes a portion of the light reflecting surface 102 that presents reflection characteristic that maintains the reflected light in a predetermined desired range of reflected angles to illuminate the interior ceiling surface CL. Thus, the cross-section of the light slat 101 illustrated in FIG. 5 has a leading edge LE that has a tighter radius than the trailing edge TE. The higher profile angles hit only a small portion of the leading edge so this incident daylight requires a steeper reflecting angle and must also be spread out to illuminate a wide area, thereby requiring a small radius smooth curve reflecting light reflecting surface 102. The lower profile angle incident daylight is incident on a larger portion of the light reflecting surface 102 and therefore requires a flatter, larger radius curvature to spread out to illuminate a wide area.

The projected light should have a smooth gradient over the entirety of the ceiling surface CL. Each column of incident daylight requires a slight spread that varies as the profile angle, where the profile angles vary over time. Therefore, the light reflecting surface 102 should have a smooth continuous surface. The spacing between adjacent light slats 101 is used to regulate the shading performed by the MOLS daylighting system 100. The redirected incident daylight uniformly illuminates the ceiling surface from a location proximate to the window glazing to the full depth of the interior space.

The light reflecting surface 102 of the light slat 101 is constructed from a continuous series of arcs, as opposed to a spline curve, which is also a continuous curve. The series of arcs must be continuous in that the slope of one arc to the next is identical. This translates to the center point of the radius of one curve having to be aligned with the center point of the radius of the next curve and the point where the two curves connect. The reason the light reflecting surface 102 has to be continuous is due to continuous and dynamic nature of the incident light striking the reflective curve. Whenever there is an abrupt change in the slope of the curve, the exiting rays become somewhat erratic. When the curve is continuous, the exiting rays are uniformly spread.

The equation that defines the radius for each arc segment in the series of curves is provided below, where:

$R_i$=Initial radius of the optical curve $R_f$=Final radius of the optical curve $\theta_i$=Initial slope of the optical curve $\theta_f$=Final slope of the optical curve N=Total number of arcs in optical curve A=Parameter that adjusts how the Radius transitions from the initial radius length to the final radius length R(n) is the radius of the $n^{th}$ arc in the series of curves, $R_i$ is the initial radius as defined in the figure above (inches).

A is a user supplied parameter, determined through iterative means.

$$B = \frac{\ln\left(\frac{R_f}{R_i}\right)}{N} - A * N$$

where:

$R_f$ is the final radius as defined in the figure above (inches).

N is the total number of arcs in the series of curves.

The equation for determining the starting slope for each arc segment in the series of curves is given by:

$$\theta(n) = \theta(n-1) - 2 * \frac{\theta_f - \theta_i}{N^2 + N} + 2 * \frac{\theta_f - \theta_i}{N + 1}$$

where;

θ(n) is the starting slope of the $n^t$ arc in the series of curves.

$\theta_i$ is the initial slope as defined in the figure above (degrees).

$\theta_f$ is the final slope as defined in the figure above (degrees).

$\theta(1)=\theta_i$

The orientation of the light slat with respect to the window glazing can be defined in terms of various parameters. Angle A1 is the Altitude Profile Angle. Angle A2 is the Exitance Angle. Angle A3 is the slope of the light reflecting surface with the horizontal at the trailing edge TE.

To help clarify the following refinements to the MOLS slat design, some definitions for the various components of the general MOLS slat shape and of the relevant design angles are necessary. The shape consists of three components: the light shading curve, the light reflecting curve, and the light redirecting slope as illustrated in FIG. 5. The light shading curve is the first surface sunrays come in contact with and determines when and how much light initially enters the MOLS system. The light reflecting curve is the next surface sunrays would come in contact with and is the primary means of reflecting daylight into the space. The light redirecting slope is the final surface sunrays would hit and is meant to re-direct high Exitance Angle rays to a lower Exitance Angle. The two angles commonly used throughout the MOLS system are the Altitude Profile Angle and the Exitance Angle. The Altitude Profile Angle is the angle from the solar disk to the horizontal for a given building facade when viewed in section. The Exitance Angle is the angle the rays exiting the MOLS system make with the horizontal when viewed in section.

Thus, the daylighting system 100 consists of a plurality of identical light slats that are mounted in a fixed position, that are in a substantially parallel and equally spaced apart relationship, for redirecting incident daylight into a room, where each of the light slats comprise an elongated substantially linear member having a first edge located proximate the window opening and a second edge distal from the first edge. The light slats each have a top surface and a bottom surface which include a light reflecting surface as well as a light shading surface, integral to the bottom surface of the light slat and extending at an acute angle with reference to the top surface of the light slat from the first edge toward the second edge to a predetermined location, for blocking low altitude components of incident daylight from entering the room. Finally, each light slat includes a light redirecting surface, integral to the bottom surface of the light slat and extending from an end of the light shading surface at the predetermined location toward the second edge, for redirecting incident daylight reflected from a light reflecting surface of an adjacent light slat onto the predetermined region of a ceiling surface of the room.

This architecture makes use of the maximum amount of the incident daylight, since the incident daylight is either directly reflected on to the ceiling or redirected from the bottom surface of the light slat to the ceiling. The use of a continuous series of arcs produces a smooth gradient over the entirety of the ceiling surface

SUMMARY

The MOLS daylighting system comprises multiple slats, each of which contains an identical optically shaped top surface to allow light to be efficiently collected and accurately and uniformly directed onto the ceiling plane of an interior space while at the same time shading the occupants from direct daylight penetration through the slats. A light shading segment and a light redirecting segment comprise the bottom surface of the light slat. The daylight incident on the daylight collection section of the glazing is collected by the optically shaped light reflecting segment of the light slats and redirected onto the ceiling plane of the room in a glare free, uniform manner. In addition, the light redirecting segment of each light slat functions to redirect incident daylight, that is reflected off the light reflecting segment of the adjacent light slat at angles above a predetermined threshold, onto the ceiling plane of the room. The light shading segment functions to block low altitude components of incident daylight from entering the room.

What is claimed:

1. A daylighting apparatus, located in a window opening located on a wall of a room, for redirecting daylight incident at said window opening into said room to illuminate said room, comprising:

a plurality of identical light reflecting element means, mounted in a fixed position, that is a substantially parallel and equally spaced apart relationship, for redirecting said incident daylight into said room, each of said light reflecting element means comprising an elongated substantially linear member having a first edge located to receive said incident daylight and a second edge distal from said first edge, each of said light reflecting element means having a top surface and a bottom surface which include:

light reflecting means, integral to said top surface and being of a geometry to redirect said incident daylight, received from a predetermined range of directions, onto a ceiling of said room, light shading means, integral to said bottom surface and extending at an acute angle with reference to said top surface from said first edge toward said second edge to a predetermined location, for blocking low altitude components of said incident daylight from entering said room, and light redirecting means, integral to said bottom surface and extending from an end of said light shading means at said predetermined location toward said second edge, for redirecting incident daylight reflected from an adjacent light reflecting element means onto said ceiling.

2. The daylighting apparatus of claim 1 further comprising:

at least two panes of glazing oriented in a parallel and spaced apart relationship, for mounting in said window opening; and said plurality of identical light reflecting element means being mounted between two adjacent ones of said at least two panes of glazing to form an integral unit.

3. The daylighting apparatus of claim 2 further comprising:

frame means for mounting said plurality of identical light reflecting element means between said two adjacent ones of said at least two panes of glazing.

4. The daylighting apparatus of claim 3 further comprising:

glazing frame means attached to a plurality of edges of said at least two panes of glazing for maintaining said at least two panes of glazing oriented in a parallel and spaced apart relationship and for mounting said at least two panes of glazing in said window opening; and wherein said frame means is attached to an interior surface of said glazing frame means and between two adjacent ones of said at least two panes of glazing to form an integral unit.

5. The daylighting apparatus of claim 3 wherein said frame means comprises:

a plurality of vertical support members for supporting said plurality of identical light reflecting element means; and header means attached to said plurality of vertical support members at a top thereof for maintaining said plurality of vertical support members in a parallel, equally spaced apart relationship.

6. The daylighting apparatus of claim 5 wherein said frame means further comprises:

a plurality of mounting member means formed at predetermined locations in each of said plurality of vertical support members for interconnecting with said plurality of identical light reflecting element means to support said plurality of identical light reflecting element means in a substantially parallel, equally spaced apart relationship.

7. The daylighting apparatus of claim 1 further comprising:

frame means, connected to said plurality of identical light reflecting element means, for mounting said daylighting apparatus juxtaposed to glazing located in said window opening.

8. The daylighting apparatus of claim 7 wherein said frame means comprises:

a plurality of vertical support members for supporting said plurality of identical light reflecting element means; and header means attached to said plurality of vertical support members at a top thereof for maintaining said plurality of vertical support members in a parallel, equally spaced apart relationship.

9. The daylighting apparatus of claim 8 wherein said frame means further comprises:

a plurality of mounting member means formed at predetermined locations in each of said plurality of vertical support members for interconnecting with said plurality of identical light reflecting element means to support said plurality of identical light reflecting element means in a substantially parallel, equally spaced apart relationship.

10. The daylighting apparatus of claim 1 wherein said light shading means comprises:

a segmented surface, wherein different portions of said segmented surface receive and block said incident daylight for different angles of said incident daylight.

11. The daylighting apparatus of claim 1 wherein said light reflecting means comprises:

a surface formed of a continuous series of arcs, responsive to receipt of incident daylight at profile angles between 10 and 80 degrees for projecting said received incident daylight up to 20 degrees above the horizontal.

12. A daylighting apparatus, located in a window opening located on a wall of a room, for redirecting daylight incident at said window opening into said room to illuminate said room, comprising:

at least two panes of glazing oriented in a parallel and spaced apart relationship, for mounting in said window opening;

a plurality of identical light reflecting element means, mounted in a fixed position, that is a substantially parallel and equally spaced apart relationship, for redirecting said incident daylight into said room, each of said light reflecting element means comprising an elongated substantially linear member having a first edge located to receive said incident daylight and a second edge distal from said first edge, and having a top surface and a bottom surface which include:

light reflecting means, integral to said top surface and being of a geometry to redirect said incident daylight received from a predetermined range of directions onto a ceiling of said room, light shading means, integral to said bottom surface and extending at an acute angle with reference to said top surface from said first edge toward said second edge to a predetermined location, for blocking low altitude components of said incident daylight from entering said room, light redirecting means, integral to said bottom surface and extending from an end of said light shading means at said predetermined location toward said second edge, for redirecting incident daylight reflected from an adjacent light reflecting element means onto said ceiling; and frame means for mounting said plurality of identical light reflecting element means between two adjacent ones of said at least two panes of glazing.

13. The daylighting apparatus of claim 12 wherein said frame means comprises:

a plurality of vertical support members for supporting said plurality of identical light reflecting element means; and header means attached to said plurality of vertical support members at a top thereof for maintaining said plurality of vertical support members in a parallel, equally spaced apart relationship.

14. The daylighting apparatus of claim 13 wherein said frame means further comprises:

a plurality of mounting member means formed at predetermined locations in each of said plurality of vertical support members for interconnecting with said plurality of identical light reflecting element means to support said plurality of identical light reflecting element means in a substantially parallel, equally spaced apart relationship.

15. The daylighting apparatus of claim 12 wherein said light shading means comprises:

a segmented surface, wherein different portions of said segmented surface receive and block said incident daylight for different angles of said incident daylight.

16. The daylighting apparatus of claim 12 wherein said light reflecting means comprises:

a surface formed of a continuous series of arcs, responsive to receipt of incident daylight at profile angles between 10 and 80 degrees for projecting said received incident daylight up to 20 degrees above the horizontal.

17. The daylighting apparatus of claim 12 wherein said light reflecting means comprises:

a surface formed of a continuous series of arcs, wherein different portions of said top surface receive said incident daylight for different angles of said incident daylight.

* * * * *